US008155851B2

(12) United States Patent
Kuzel et al.

(10) Patent No.: US 8,155,851 B2
(45) Date of Patent: Apr. 10, 2012

(54) METHOD FOR SUPPORTING A BRAKE SYSTEM IN CASE OF REDUCED EFFECTIVENESS OF THE VEHICLE BRAKE SYSTEM

(75) Inventors: Thomas Kuzel, Groß-Krotzenburg (DE); Jürgen Krüber, Winningen (DE); Bernd Ummer, Bodnegg (DE); Holger Esslinger, Alzey (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 944 days.

(21) Appl. No.: 11/663,386

(22) PCT Filed: Sep. 20, 2005

(86) PCT No.: PCT/EP2005/054689
§ 371 (c)(1),
(2), (4) Date: Aug. 3, 2007

(87) PCT Pub. No.: WO2006/032660
PCT Pub. Date: Mar. 30, 2006

(65) Prior Publication Data
US 2008/0040012 A1  Feb. 14, 2008

(30) Foreign Application Priority Data
Sep. 24, 2004  (DE) .......................... 10 2004 046 377

(51) Int. Cl.
*B60T 13/00* (2006.01)
(52) U.S. Cl. ....... 701/70; 280/425.1; 280/428; 280/504; 477/186; 477/187; 303/7

(58) Field of Classification Search ................. 701/70; 477/182, 186, 187; 303/122, 140, 7; 280/418.1, 280/423.1, 432, 406.2, 407.1, 425.1, 428, 280/504; 180/410, 412; 340/431, 465, 671
See application file for complete search history.

(56) References Cited

U.S. PATENT DOCUMENTS

| 5,281,012 | A  | * | 1/1994  | Binder et al. ............. 303/113.5 |
| 5,986,544 | A  | * | 11/1999 | Kaisers et al. ............ 340/431 |
| 6,152,252 | A  | * | 11/2000 | Pettersson ............... 180/282 |
| 6,226,586 | B1 |   | 5/2001  | Luckevich et al. |
| 6,402,265 | B1 | * | 6/2002  | Hachtel ................... 303/115.4 |
| 6,460,941 | B1 | * | 10/2002 | Zenzen et al. ............ 303/122.03 |
| 6,636,047 | B2 | * | 10/2003 | Arlt et al. ................. 324/504 |
| 7,147,070 | B2 | * | 12/2006 | Leclerc .................... 180/14.2 |
| 7,925,412 | B2 | * | 4/2011  | Romanchok et al. ........ 701/82 |

(Continued)

FOREIGN PATENT DOCUMENTS
DE        10137273        3/2001
(Continued)

*Primary Examiner* — Tuan C. To

(57) ABSTRACT

Disclosed is a method for increasing a braking effect in a motor vehicle with a hydraulic brake system. An energy supply unit, which is used to increase the brake pressure in at least one wheel brake, is switched on when the brake pressure adjusted by the driver in a master brake cylinder exceeds an activation threshold, which is determined depending on a detected vehicle deceleration. A check is made whether an unbraked trailer is coupled to the vehicle, and in that the activation threshold $P_{AT}$ is raised, if the presence of an unbraked trailer that is coupled to the vehicle is detected.

13 Claims, 2 Drawing Sheets

U.S. PATENT DOCUMENTS

| | | |
|---|---|---|
| 7,950,751 B2 * | 5/2011 | Offerle et al. ................. 303/193 |
| 2001/0018630 A1 * | 8/2001 | Wetzel et al. .................... 701/70 |
| 2001/0027892 A1 * | 10/2001 | Masters et al. ................ 180/403 |
| 2002/0069006 A1 * | 6/2002 | Faye et al. ........................ 701/70 |
| 2003/0045989 A1 * | 3/2003 | Walenty et al. ................. 701/71 |
| 2003/0085562 A1 * | 5/2003 | Sparling ........................ 280/789 |
| 2005/0110342 A1 * | 5/2005 | Eberling et al. ........... 303/115.1 |

FOREIGN PATENT DOCUMENTS

| | | |
|---|---|---|
| DE | 10238427 | 5/2003 |
| JP | 08091186 A * | 4/1996 |

* cited by examiner

METHOD FOR SUPPORTING A BRAKE SYSTEM IN CASE OF REDUCED EFFECTIVENESS OF THE VEHICLE BRAKE SYSTEM

BACKGROUND OF THE INVENTION

The present invention relates to a method for increasing the braking effect in a motor vehicle with a hydraulic brake system, wherein an energy supply unit, which is used to increase the brake pressure in at least one wheel brake, is switched on when the brake pressure adjusted by the driver in a master brake cylinder reaches a first activation threshold value, which is determined depending on a detected vehicle deceleration.

When subjected to high thermal load, under the influence of saline solution and major wear, hydraulic brake systems exhibit a reduced effectiveness so that, even given a high initial pressure in the master brake cylinder that is adjusted by the driver, the brake system will not bring about sufficient deceleration of the vehicle. The reduced braking effect at high working temperatures of the brake system is referred to as 'fading'.

In the cases illustrated hereinabove, the reduced braking effect of the vehicle brake system results, however, especially from a reduced coefficient of friction between the brake pads and the brake disc, so that a special rate of brake pressure is required in order to brake the vehicle effectively.

German published application DE 102 38 427 A1 discloses a method of the type referred to hereinabove, wherein in case of limited effectiveness of the vehicle brake, enabling of an energy source causes increase of the brake pressure or the brake force in the wheel brakes. A method of this type is also referred to as FBS function (FBS: Fading Brake Support).

The energy source, which is usually a pump, is activated in the FBS function when the initial pressure in the master brake cylinder adjusted by the driver exceeds an activation threshold, which is determined depending on the vehicle deceleration. Thus, the pump is switched on when the actual vehicle deceleration is by a defined value lower than the vehicle deceleration that is expected due to the adjusted initial pressure, with the brake system functioning properly.

It has shown that in car-trailer combinations consisting of a vehicle and a loaded unbraked trailer, frequent spurious releases of the FBS function are encountered, meaning the FBS function is activated although the brake system of the vehicle exhibits its normal braking power.
This is very disadvantageous for the driver of such a car-trailer combination because a considerably higher braking power is reached in a brake operation by way of the spurious releases of the FBS function than is expected and desired by the driver. The result is a major loss in comfort for the driver. In addition, unexpected abrupt braking of the vehicle can provoke rear end collisions.

In view of the above, an object of the invention is to overcome the illustrated shortcomings of the state of the art, and, in doing so, to prevent in particular spurious releases of the FBS function in car-trailer combinations consisting of a vehicle and a trailer.

SUMMARY OF THE INVENTION

According to the invention, this object is achieved by a method for increasing the braking effect in a motor vehicle with a hydraulic brake system, wherein an energy supply unit, which is used to increase the brake pressure in at least one wheel brake, is switched on, when the brake pressure adjusted by the driver in a master brake cylinder exceeds a first activation threshold value, which is determined depending on a detected vehicle deceleration. A check is made whether an unbraked trailer is coupled to the vehicle, and in that the activation threshold ($p_{AT}$) is raised, if the presence of an unbraked trailer that is coupled to the vehicle is detected.

The invention arranges that a method of the type initially mentioned is implemented in such a fashion that a check is made whether an unbraked trailer is coupled to the vehicle, and that the activation threshold value is increased, if the presence of an unbraked trailer that is coupled to the vehicle is detected.

Thus, the invention is based on the idea of preventing spurious releases of the FBS function in that a raised activation threshold is made the basis for the activation of the FBS function in car-trailer combinations with an unbraked trailer. This way, the FBS function is triggered only if the braking effect of the brake system is actually reduced even in car-trailer combinations where the vehicle deceleration with a loaded, unbraked trailer is lower, with the same brake pressure prevailing.

In a favorable embodiment of the invention, it is provided that the verification, whether an unbraked trailer is coupled to the vehicle, is performed by way of a comparison between at least one value of the brake pressure that prevails during a brake operation and a value of the vehicle deceleration that prevails substantially simultaneously with the value of the brake pressure.

Advantageously, the verification whether an unbraked trailer is coupled to the vehicle is performed by way of a learning algorithm, which checks the existence of an unbraked trailer by way of a comparison between the initial pressure sensed during a brake operation and the detected vehicle deceleration.

This procedure founds on the fact that there is a linear relation, at least in approximation, between the initial pressure and the vehicle deceleration, said relation being influenced especially by the total mass of the vehicle or the car-trailer combination. This influence e.g. brings about that a higher initial pressure must be adjusted when a greater total mass prevails, in order to achieve a defined vehicle deceleration.

When the brakes are properly functioning, the linear relation, at least in approximation, exists only if the wheels of the vehicle do not lock in the brake operation, or if the brake operation is performed without an ABS intervention, where the wheel brake pressure is reduced compared to the initial pressure in order to prevent locking of the wheels.

Therefore, it is preferably tested, whether the brake pressure in the master brake cylinder exceeds a locking pressure, and the mentioned comparison is performed only when it is found out that the brake pressure is below a locking pressure.

The term 'locking pressure' herein implies the value of the brake pressure at which the wheels begin to lock, i.e. the wheel slip exceeds a defined threshold value. The locking pressure is typically determined in an anti-lock system (ABS) and corresponds to the pressure at which the ABS is activated.

In an appropriate embodiment of the invention, a signal indicating the activation condition of an ABS is, therefore, used to verify whether the brake pressure in the master brake cylinder exceeds a locking pressure.

In other favorable embodiments of the invention, it can also be provided that the comparison is performed only when the value of the brake pressure in the master brake cylinder lies within a predetermined pressure range, and/or when the rate of change (gradient) of the brake pressure lies below a predetermined threshold value.

The pressure range and the threshold value for the rate of change are defined in such a manner that, based on these conditions, it is also possible to reliably ensure that the wheel slip is so low that the described relation, linear in approximation, between the brake pressure and the vehicle deceleration is valid.

In another preferred embodiment of the invention, it is arranged that when verifying whether an unbraked trailer is coupled to the vehicle, a relation between the value of the brake pressure in the master brake cylinder and the value of the vehicle deceleration is compared to a predetermined threshold value.

In this case, the presence of an unbraked trailer is preferably detected when the relation between the value of the brake pressure and the value of the vehicle deceleration exceeds the predetermined threshold value.

In another favorable embodiment of the invention, several pairs of values with respectively one value of the brake pressure and one value of the vehicle deceleration are determined at different points of time during at least one brake operation, and that the relation between the value of the brake pressure and the value of the vehicle deceleration is determined for each pair of values.

The verification whether an unbraked trailer is coupled to the vehicle is preferably performed in that an average value is produced from the relations calculated for several pairs of values and is compared to the predetermined threshold value.

The presence of an unbraked trailer coupled to the vehicle is detected in a suitable embodiment of the invention when the average value exceeds the threshold value.

Thus, the verification of the presence of an unbraked trailer, which is coupled to the vehicle, is executed by way of a large number of values for the initial pressure and the vehicle acceleration, which are determined during a brake operation, so that a very reliable statement can be made with regard to the presence of such a trailer.

In another suitable embodiment of the invention, the verification whether an unbraked trailer is coupled to the vehicle is executed by testing that the electric connecting lines between the vehicle and the trailer are engaged.

The presence of an unbraked trailer coupled to the vehicle is then suitably detected when one connection of the connecting lines of the trailer for actuation of a brake system of the trailer is not engaged.

This is an alternative of the previously described learning algorithm, which does not allow, however, determining the load condition of the trailer, as the learning algorithm does.

It is furthermore provided in additional preferred embodiments of the invention to check whether a plug has been plugged into a trailer socket of the vehicle, and that the verification whether an unbraked trailer is coupled to the vehicle is performed only when it has been established that a plug is plugged into the trailer socket of the vehicle.

Favorably, the presence of an unbraked trailer is hereby verified in conformity with requirements, i.e. only when a trailer is actually coupled to the vehicle.

Further advantages, special features, and suitable improvements of the invention can be seen in the subsequent illustration of preferred embodiments of the invention by way of the Figures.

DETAILED DESCRIPTION OF THE INVENTION

Figure 1:
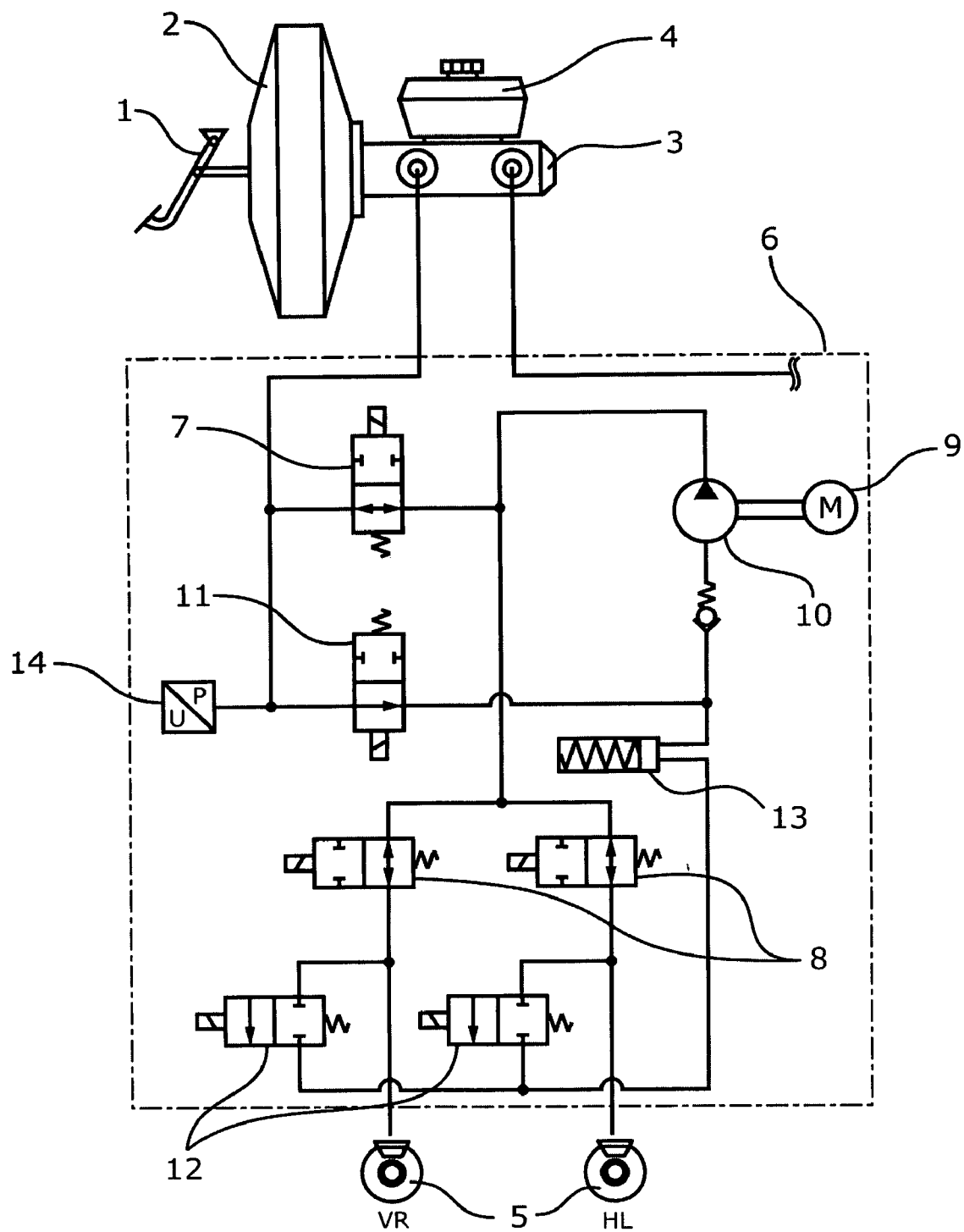
FIG. 1 shows the principal design of a vehicle brake system that is suitable to implement the invention.

The vehicle brake system, which is shown in a cross-sectional view in FIG. 1 and is well suited to implement the invention, comprises an actuating device 1, which is connected to a master brake cylinder 3 by way of a brake booster 2 and is preferably designed as a brake pedal.

The master brake cylinder 3 connects to a supply tank 4 for hydraulic fluid in terms of flow. Advantageously, it is configured as a so-called tandem master cylinder, wherein in each case one of two coupled pressure chambers is provided to supply one brake circuit with pressure. Usually, there is an X-allotment of the brake circuits, meaning that one pressure chamber feeds the front right (FR) and the rear left (RL) wheel brake 5, while the other pressure chamber feeds the front left and the rear right wheel brake 5.

The master brake cylinder 3 connects to the wheel brakes 5 by way of a hydraulic unit 6, which is provided in equal form for each one of the two brake circuits. Therefore, only that part of the hydraulic unit is shown in FIG. 1 that is associated with one of the brake circuits.

The wheel brakes 5 connect to the master brake cylinder 3 by way of a normally open separating valve 7, and one inlet valve 8, which is also normally open, is assigned to each wheel brake 5 in addition. In a brake operation, which is exclusively controlled by the driver, the brake pressure $p_{TMC}$, which is built up in the master brake cylinder 3 by the driver using the brake booster 2 and which is also referred to as initial pressure, is transmitted directly to the wheel brakes 5.

The illustrated brake force system, however, also permits an externally controlled development of brake pressure in the wheel brakes 5 by means of the hydraulic pump 10 driven by the motor 9. For pressure build-up, the separating valve 7 closes and the normally closed change-over valve 11 opens so that a connection is provided between the master brake cylinder 3 and the suction side of the hydraulic pump 10, and the master brake cylinder 3 is uncoupled from the pressure side of the hydraulic pump 10. The hydraulic pump 10 is thus in a position to supply hydraulic fluid from the master brake cylinder 3 or the supply tank 4 into the wheel brakes 5 in order to increase the wheel brake pressure.

A normally closed outlet valve 12 is associated with each wheel brake 5 in order to reduce the brake pressure in the wheel brakes 5. When the outlet valve 12 opens, hydraulic fluid can escape from the corresponding wheel brake 7 into the low-pressure accumulator 13. The hydraulic fluid can then be supplied out of the low-pressure accumulator 13 back into the master brake cylinder 3 using the hydraulic pump 10, to what end the change-over valve 11 and the inlet valves 8 close and the separating valve 7 opens.

In addition, a brake pressure in the wheel brakes 5 can be maintained constant by closing both the inlet valve 8 associated with the wheel brake 5 and the associated outlet valve 12.

The brake pressure $p_{TMC}$ adjusted by the driver in the master brake cylinder 3 is measured by means of a pressure sensor 14, whose signal is transmitted to a control unit that executes the control of the hydraulic unit 6 and the valves 7, 8, 11 and 12 incorporated therein, and of the motor 9.

Brake systems configured in the illustrated way are known to the expert in the art in particular as a component of ESP systems (ESP: Electronic Stability Program) being used already in a large number of vehicles. Such brake systems can be used in an ABS system (ABS: Anti-Lock System) as well.

In addition, it is also possible to realize the FBS function, on which the invention at topic is based, in brake systems of this type.

According to the FBS function, brake pressure that is increased compared to the driver's specifications is applied to the wheel brakes 5 using the hydraulic pump 10 when a reduced effectiveness of the brake system is detected during a brake operation.

This corresponds to the activation of a so-called brake assist system, the function of which consists in increasing the brake pressure in the wheel brakes 5 compared to the brake pressure $p_{TMC}$ in the master brake cylinder 3. The brake assist system is activated especially in emergency braking situations and is per se known to the expert in the art.

To activate the FBS function, an activation threshold value $p_{AT}$ for the brake pressure $p_{TMC}$ in the master brake cylinder 3 is calculated in the control unit provided to control the FBS function during a brake operation depending on the vehicle deceleration |b| that is measured by means of a longitudinal acceleration sensor and/or determined from the signals of wheel rotational speed sensors, as has been described in detail in German published application DE 102 38 427 A1. Reference is made to the latter publication in connection with the FBS function, especially with regard to determining the activation threshold value $p_{AT}$.

The vehicle deceleration |b| in this respect refers to the amount of the negative acceleration of the vehicle during a brake operation.

Once the brake pressure $p_{TMC}$ adjusted by the driver in the master brake cylinder 3 exceeds the activation threshold $p_{AT}$, the brake assist system is activated. Preferably, the brake assist system is designed as a so-called hydraulic brake assist system (HBA), where the pressure increase is carried out by means of the hydraulic unit 6, i.e. in particular by means of the hydraulic pump 10 driven by the motor 9, to what end the motor 9 and the valves 7, 11 are driven in the corresponding fashion by the FBS control unit (i.e. the separating valve 7 closes and the change-over valve 11 opens).

Figure 2:
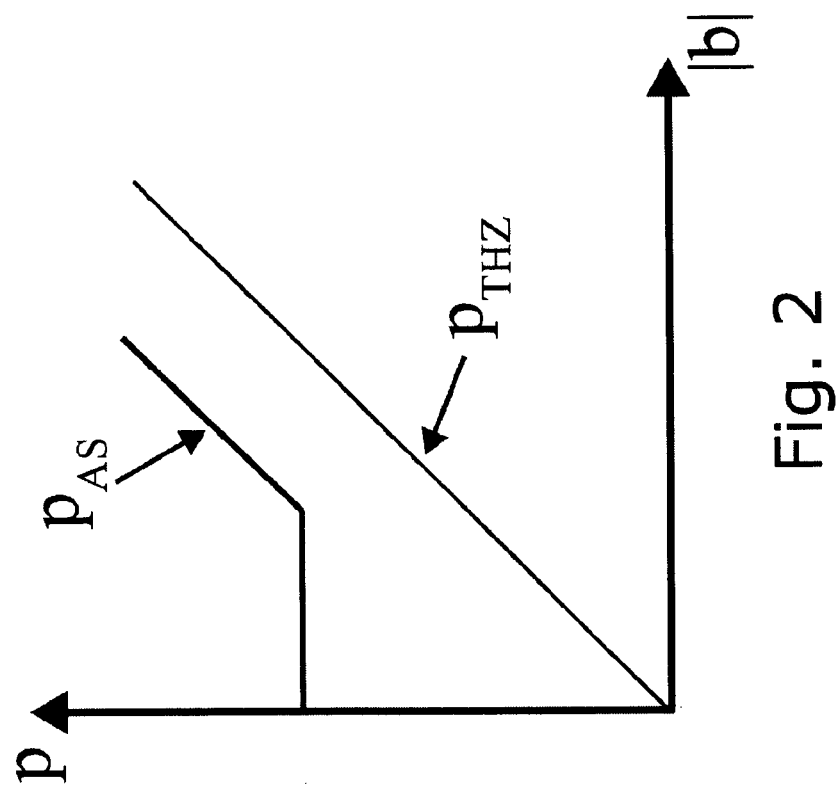
FIG. 2 is a pressure-deceleration diagram for illustrating the activation threshold of the FBS function according to the state of the art.

In FIG. 2, the principal variation of the activation threshold value $P_{AT}$ in the known embodiment of the FBS function is plotted in a pressure-deceleration diagram, the said variation being achieved in the fashion described in the following:

With the brake intact, there is a linear relation, at least in approximation, between the brake pressure $p_{TMC}$ and the vehicle deceleration |b| in partial braking, i.e. in a brake operation where at least very low wheel slip prevails or no ABS intervention takes place, respectively. The vehicle deceleration |b| is proportional to the brake pressure $p_{TMC}$ in the master brake cylinder 3. A corresponding pressure-deceleration characteristic curve of a vehicle is plotted as an example in the diagram in FIG. 2 (see bottom curve in the diagram).

The activation threshold $p_{AT}$ of the FBS function is offset in upward direction by a tolerance value compared to this characteristic curve and basically has the same gradient as the characteristic curve. Besides, the activation threshold $p_{AT}$ is limited to a minimal value so that in total the course of the activation threshold as illustrated in FIG. 2 is achieved.

When a loaded unbraked trailer is coupled to the vehicle, the mass of the vehicle or the car-trailer combination that is to be decelerated by means of the vehicle brake system rises. The linear relation between the brake pressure $p_{TMC}$ and the vehicle deceleration |b| remains as it is, however, the gradient of the pressure-deceleration characteristic curve rises, as can be seen in the diagram in FIG. 3 (see bottom curve in the diagram).

It has shown that there is a frequent occurrence of spurious releases of the FBS function in car-trailer combinations with a loaded unbraked trailer, with the activation threshold $p_{AT}$ unmodified.

Therefore, it is arranged within the limits of the invention to raise the activation threshold $p_{AT}$ of the FBS function when it is detected that an unbraked trailer is coupled to the vehicle.

Preferably, in particular the minimal value of the activation threshold $p_{AT}$ is raised by a predetermined amount. The amount ranges between 2 bar and 40 bar, it is preferably 5 bar. In any case, this value must be chosen to be so great that spurious releases of the FBS function in trailer operation are prevented.

Figure 3:
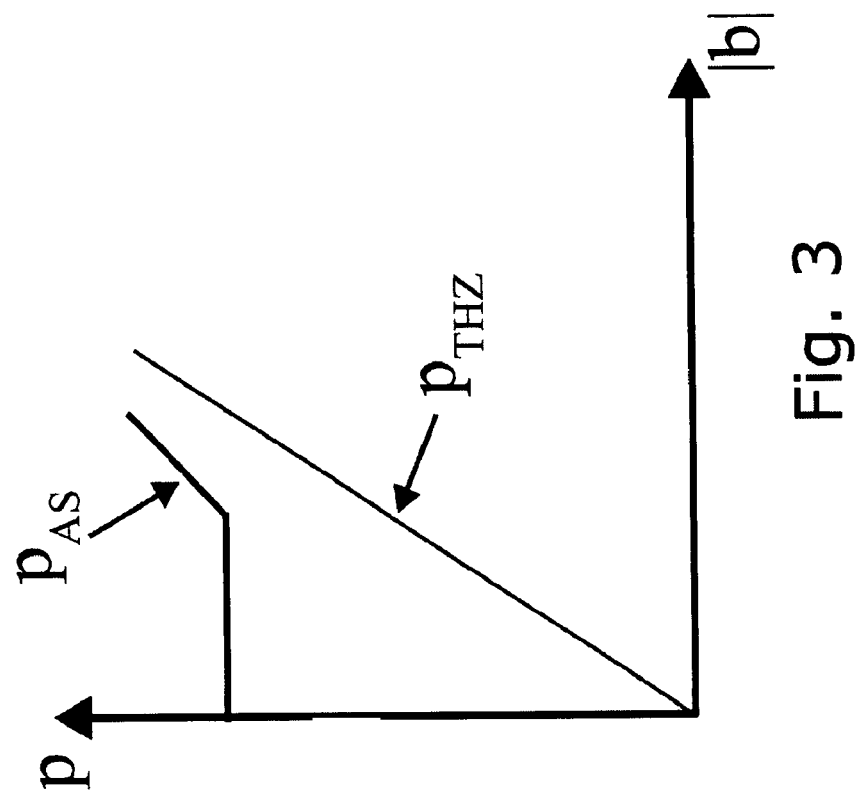
FIG. 3 is a pressure-deceleration diagram for illustrating the activation threshold of the FBS function that is raised according to the invention.

The gradient of the activation threshold $P_{AT}$ is not adapted in one embodiment of the invention so that in total the course illustrated in the diagram in FIG. 3 is achieved for the raised activation threshold $p_{AT,R}$.

In other embodiments of the invention, however, it may likewise be arranged to increase the gradient of the activation threshold $p_{AT}$ as well and thus adapt the variation of the raised activation threshold $p_{AT,R}$ to the pressure-deceleration characteristic curve.

The presence of an unbraked trailer coupled to the vehicle can be verified in different ways, and the respectively provided check is preferably made only when the FBS control unit has detected that a plug is plugged into the trailer socket of the vehicle.

One possibility of verifying the presence of an unbraked trailer involves that it is not only checked by way of the electric connections of the trailer whether a trailer is coupled, but also whether the trailer is braked or unbraked.

To this end, a check is made whether the connection or contact of the trailer socket, through which an activation signal can be transmitted to the brake system of a braked trailer, is engaged or connected to an electric connection of the plug. If this is not the case, it is established by the control unit of the FBS function that an unbraked trailer is coupled to the vehicle.

However, the load condition of the trailer cannot be determined in this procedure.

It is therefore provided within the limits of another embodiment of the invention to use a learning algorithm where the relation $v=p_{TMC}/|b|$ between the brake pressure $p_{TMC}$ and the vehicle deceleration |b| is calculated, with the brake pressure $p_{TMC}$ being determined by means of the pressure sensor 14 and the vehicle deceleration |b| being determined from the signals of wheel rotational speed sensors or by means of a longitudinal acceleration sensor.

It is also possible in a known fashion to detect by way of an increase of the brake pressure $p_{TCM}$ that the driver applies the brake and that a brake operation is carried out.

Well suited for the verification of the presence of a loaded unbraked trailer are brake operations which are so-called partial braking maneuvers, where the wheel slip is very slow or no ABS intervention takes place, respectively. Thus, there is the linear relation between the vehicle deceleration |b| and the brake pressure $p_{TMC}$, which has been explained above.

In vehicles, which are equipped with ABS, what is generally the case when an FBS function is provided in the vehicle, partial braking can be detected by way of a signal indicative of the activation condition of the ABS. When the FBS control unit finds out by way of the signal that the ABS is not activated, this implies partial braking.

In addition, a check can be made whether the brake pressure $p_{TMC}$ in the brake operation lies within a predetermined range of e.g. 20 to 50 bar and/or the gradient of the brake pressure $p_{TMC}$ is lower than a predetermined threshold value of 100 bar/s, for example, in order to safeguard that the brake operation is a suitable brake operation, where there is proportionality between the brake pressure $p_{TMC}$ and the vehicle deceleration |b|.

During the appropriate partial braking maneuvers, which are established in the fashion described hereinabove, a pair of values is determined in the FBS control unit at different points of time, for example, one time in each clock pulse of the clock-controlled control unit. The pair of values comprises the current value of the brake pressure $p_{TMC}$ and the current value of the vehicle deceleration |b|.

The relation v between the value of the brake pressure $p_{TMC}$ and the value of the vehicle deceleration |b| is then calculated for each pair of values.

The calculated relations are filtered over a period, which preferably comprises a brake operation of the type described above. The filtered value is compared with a predetermined threshold value, and the rise of the FBS activation threshold $p_{AS}$ as described before is performed by the FBS control unit, when the filtered value that is determined based on the relations exceeds a predetermined threshold value.

In particular, it is arranged that an average value is calculated based on the relations v between the brake pressure $p_{TMC}$ and the vehicle deceleration |b|, which relations are produced for each pair of values determined during a brake operation, and the conditions v produced for the acquired pairs of values are successively used to calculate the average value so that an updated average value is produced e.g. in each clock pulse of the FBS control unit. The average value is then compared with the predetermined threshold value and the FBS activation threshold $p_{AT}$ is raised when the average value is higher than the threshold value.

It can be arranged that—provided a trailer is coupled to the vehicle—an average value is produced from the relations v in each brake operation, and the comparison between the average value and the predetermined threshold value is performed upon termination thereof.

When the activation threshold $p_{AT}$ is already raised and when the comparison has as a result that the average value is lower than the threshold value, what may e.g. be the case after unloading of the trailer, the activation threshold is reset to the original value.

Thus, the invention provides a favorable method preventing spurious releases of the FBS function in car-trailer combinations with a loaded unbraked trailer by making a raised activation threshold $p_{AT,R}$ the basis for initiating the FBS function, so that the FBS function is only activated at a higher brake pressure $p_{TMC}$, with the vehicle deceleration |b| being the same. The verification whether an unbraked trailer is coupled to the vehicle is achieved by way of a learning algorithm in favorable embodiments of the invention.

List of Reference Numerals:
1 actuating device
2 brake booster
3 master brake cylinder
4 supply tank
5 wheel brake
6 hydraulic unit
7 separating valve
8 inlet valve
9 motor
10 hydraulic pump
11 change-over valve
12 outlet valve
13 low-pressure accumulator
14 pressure sensor
|b| vehicle deceleration
p pressure
$p_{AT}$ activation threshold
$p_{TMC}$ brake pressure in the master brake cylinder

The invention claimed is:

1. A method for increasing a braking effect in a motor vehicle with a hydraulic brake system, the method comprising:
switching on an energy supply unit, which is used to increase the brake pressure in at least one wheel brake, when a brake pressure, adjusted by a driver, in a master brake cylinder exceeds a first activation threshold value, which is determined depending on a detected vehicle deceleration; and
checking whether an unbraked trailer is coupled to the vehicle; and
raising the activation threshold ($p_{AT}$) if the presence of an unbraked trailer coupled to the vehicle is detected.

2. A method according to claim 1, wherein checking whether an unbraked trailer is coupled to the vehicle, is performed by comparing at least one value of the brake pressure ($p_{TMC}$) that prevails during a brake operation and a value of the vehicle deceleration (|b|) that prevails substantially simultaneously therewith.

3. A method according to claim 2, further comprising testing whether the brake pressure ($p_{TMC}$) exceeds a locking pressure, and the comparison is performed only when the brake pressure ($p_{TMC}$) is below a locking pressure.

4. A method according to claim 3, wherein testing whether the brake pressure ($p_{TMC}$) exceeds the locking pressure takes place based on a signal indicative of the activation condition of an anti-lock system.

5. A method according to claim 1, wherein the comparison is only performed when at least one of the value of the brake pressure ($p_{TMC}$) lies within a predetermined pressure range, or when the rate of change of the brake pressure ($p_{TMC}$) lies below a predetermined gradient threshold value.

6. A method according to claim 1, wherein when checking whether an unbraked trailer is coupled to the vehicle, a relation (v) between the value of the brake pressure ($p_{TMC}$) and the value of the vehicle deceleration (|b|) is compared to a predetermined threshold value.

7. A method according to claim 1, wherein the presence of an unbraked trailer coupled to the vehicle is detected when the relation (v) between the brake pressure ($p_{TMC}$) in the master brake cylinder (3) and the vehicle deceleration (|b|) exceeds the predetermined threshold value.

8. A method according to claim 1, wherein several pairs of values with respectively one value of the brake pressure ($p_{TMC}$) and one value of the vehicle deceleration (|b|) are determined at different points of time during at least one brake operation, and in that the relation between the value of the brake pressure ($p_{TMC}$) and the value of the vehicle deceleration (|b|) is determined for each pair of values.

9. A method according to claim 1, wherein the checking whether an unbraked trailer is coupled to the vehicle is performed in that an average value is calculated from the relations (v) determined for the several pairs of values and is compared to the predetermined threshold value.

10. A method according to claim 1, wherein the presence of an unbraked trailer coupled to the vehicle is detected when the average value exceeds the threshold value.

11. A method according to claim 1, wherein the checking whether an unbraked trailer is coupled to the vehicle is executed by testing that the electric connecting lines between the vehicle and the trailer are engaged.

12. A method according to claim 11, wherein the presence of an unbraked trailer coupled to the vehicle is detected when one connection of the connecting lines of the trailer for actuation of a brake system of the trailer is not engaged.

13. A method according to claim 1 further comprising whether a plug has been plugged into a trailer socket of the vehicle, and verification whether an unbraked trailer is coupled to the vehicle is performed only when it has been established that a plug is plugged into the trailer socket of the vehicle.

* * * * *